June 6, 1950  J. W. JACOBY  2,510,697
CLUTCH SHIFTER
Filed May 15, 1946  3 Sheets-Sheet 1

INVENTOR:
JOHN W. JACOBY,
BY: Donald G. Dalton
HIS ATTORNEY.

June 6, 1950 J. W. JACOBY 2,510,697
CLUTCH SHIFTER
Filed May 15, 1946 3 Sheets-Sheet 2
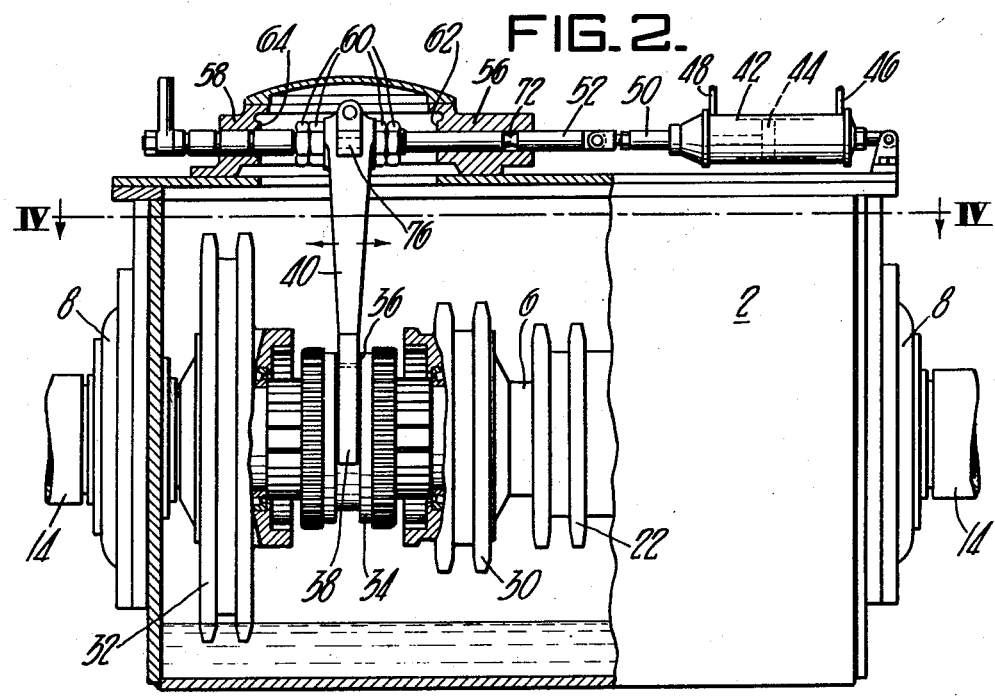
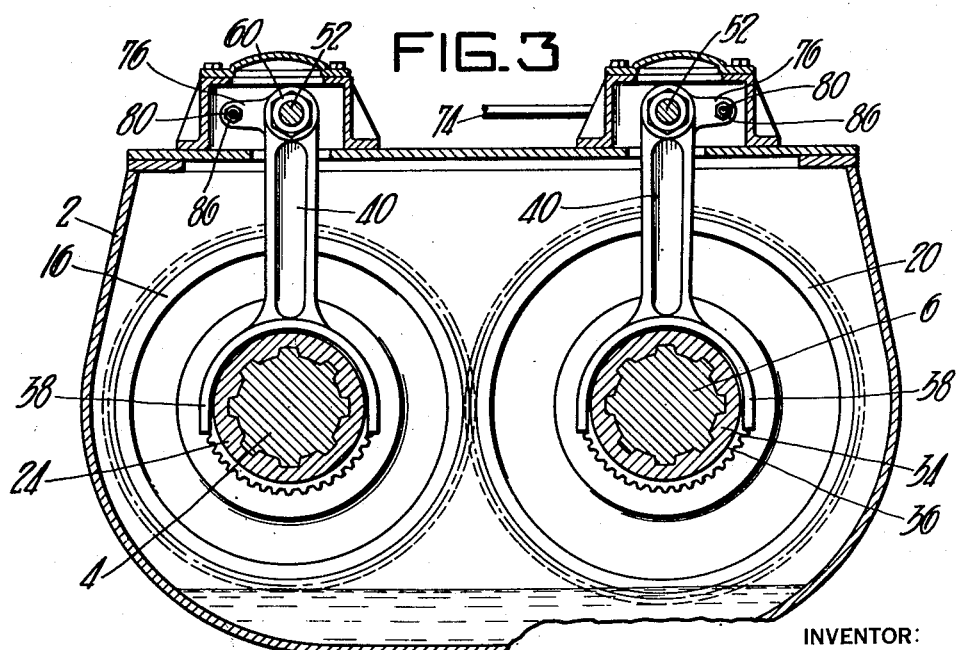
INVENTOR:
JOHN W. JACOBY,
BY:
Donald G. Dalton
HIS ATTORNEY.

June 6, 1950  J. W. JACOBY  2,510,697
CLUTCH SHIFTER
Filed May 15, 1946  3 Sheets-Sheet 3

INVENTOR:
JOHN W. JACOBY,
BY: Donald G. Dalton
HIS ATTORNEY.

Patented June 6, 1950

2,510,697

UNITED STATES PATENT OFFICE 2,510,697

CLUTCH SHIFTER

John W. Jacoby, Oil City, Pa., assignor to Oil Well Supply Company, a corporation of New Jersey Application May 15, 1946, Serial No. 669,870

6 Claims. (Cl. 74—364)

This invention relates to a clutch shifter and more particularly for such a shifter for use in a transmission having two parallel shafts with a pair of clutches on each shaft. Such transmissions are used to rotate the drums of oil field hoists or drawworks. To shift the clutches, two double acting shifters are employed, one for shifting the clutches on each shaft. Each of the shifters is actuated by an air cylinder. For various reasons the air cylinders may not return to their neutral position. Since two cylinders are used, it is possible that both of the cylinders may be moved from their neutral position at the same time. It is desirable to eliminate these faults since they cause damage to the equipment and/or prevent quick operation of the drawworks.

It is an object of my invention to provide a clutch shifter which has means for returning the clutches to their neutral position as soon as air is exhausted from the power cylinder.

Another object is to provide an inter-lock between the two cylinders so that they cannot both be removed from the neutral position at the same time.

These and other objects will be more apparent after referring to the following specification and attached drawings, in which:

Figure 2 is a view, partly in cross section, taken on the line II—II of Figure 1;

Figure 3 is a vertical sectional view taken on the line III—III of Figure 1;

Figure 1:
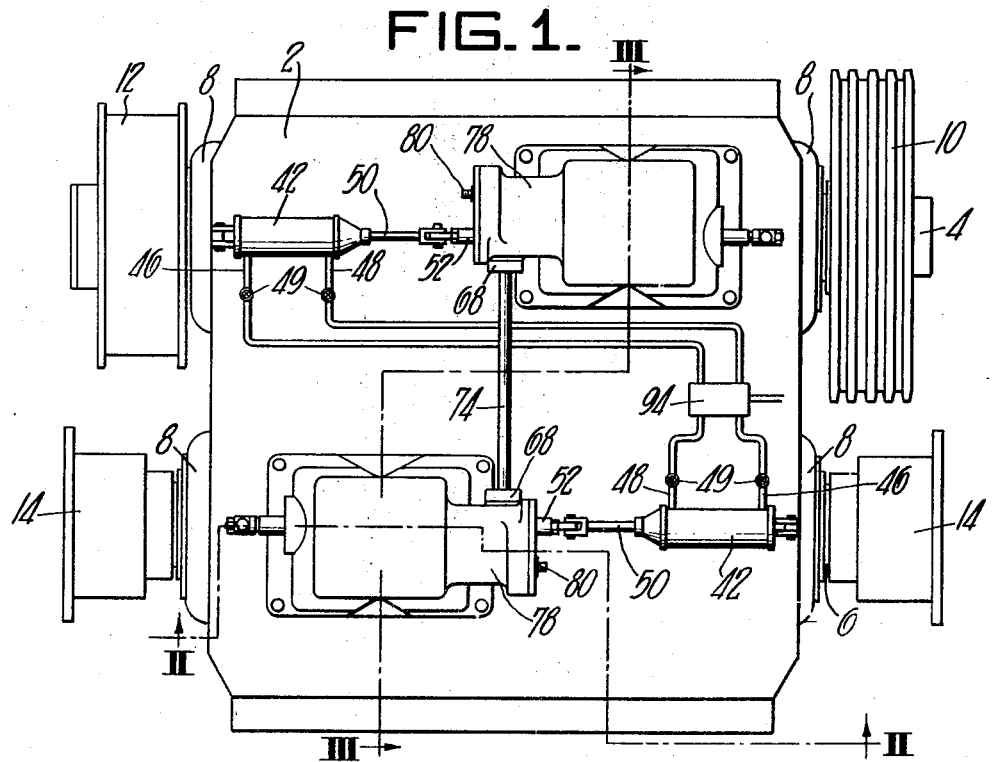
Figure 1 is a plan view of my device.

Referring more particularly to the drawings, the reference numeral 2 indicates the housing of the transmission. Two parallel shafts 4 and 6 are rotatably mounted in bearings 8 in the housing 2. The shaft 4 extends from both ends of the housing with a sprocket 10 being mounted on one end of shaft 4. Power is supplied to sprocket 10 from any suitable power source. The other end of shaft 4 is provided with a brake 12. The shaft 6 extends from both ends of the housing 2 and has couplings 14 mounted thereon so that power may be taken therefrom at either end. Rotatably mounted on shaft 4 is a gear 16 and sprocket 18 which are adapted to engage a gear 20 and sprocket 22, respectively, which are mounted on shaft 6 for rotation therewith. A double acting clutch 24 has a spline connection with shaft 4 and is located between gear 16 and sprocket 18. Sprockets 26 and 28 are mounted on shaft 4 for rotation therewith and are adapted to engage sprockets 30 and 32, respectively, which are rotatably mounted on shaft 6. A double acting clutch 34 has a spline connection with shaft 6 between sprockets 30 and 32. Clutch 34 has a slot 36 in its outer periphery for receiving the fork 38 of a lever 40 which extends upwardly through the top of housing 2. Mounted on top of the housing 2 is a double acting power cylinder 42, the axis of which is parallel to the shafts 4 and 6. A piston 44 is mounted in cylinder 42. Air conduits 46 and 48 having quick release valves 49 therein are located at opposite sides of the piston 44. A piston rod 50 is attached to the piston 44 and extends therefrom toward the lever 40. Connected to the rod 50 is a rod 52 which passes through an opening 54 in the lever 40. Rod 52 is slidably received in bearings 56 and 58 mounted on each side of lever 40. Nuts 60, mounted on rod 52, limit the movement of rod 52 by engaging abutments 62 and 64 adjacent bearings 56 and 58, respectively. Movement of the piston 44 shifts the clutch 34 into engagement with the sprockets 30 or 32 depending upon the direction of movement. Similar operating mechanism is provided for shifting the clutch 24 and the same reference numerals are applied thereto. Each of the bearings 56 has an opening 66 therein facing the opposite bearing with the axes of said openings being in the same transverse plane with respect to the rods 52. A retainer plate 68, having an axial opening 69 therein, is bolted to the bearing 56. A groove 70 is provided in each of the rods 52, the groove having a circular cross section with the axes of the grooves being in the same transverse plane when the pistons 44 are in their neutral position. A hardened steel ball 72 is provided in each of the openings 66 with a bar 74 extending therebetween, the overall length of the pair of balls and the bar being substantially equal to the distance between the pair of rods 52 plus the depth of one of the grooves 70. The radius of the groove 70 is substantially the same as that of the ball 72. The lever 40 has a lug 76 thereon extending to one side thereof. A cylinder 78 is mounted adjacent the rod 52 and a bar 80 extends through openings 82 in the ends of the cylinder and through an opening 84 in lug 76. Nuts 86 screwed on bar 80 on each side of the lug 76 fasten the bar 80 to the lug 76 in adjusted position. A pair of bearing members 88 are slidably mounted on the bar 80 which has nuts 90 screwed thereon to provide abutments for the bearing members 88. A pair of springs 92, one within the other, surround the rod 80 and bear against the bearing members 88 to hold them against the abutments 90. Since the clutches 24 and 34 are at opposite ends of the housing, the cylinders 42 face in opposite directions as clearly shown in Figure 1. The four actions of the two double acting cylinders 42 are preferably controlled by a four-way air valve 94. By using a four-way valve it is impossible to apply air to actuate more than one of the clutches at the same time. If desired, separate valves could be used to control each of the air lines.

Figure 5:
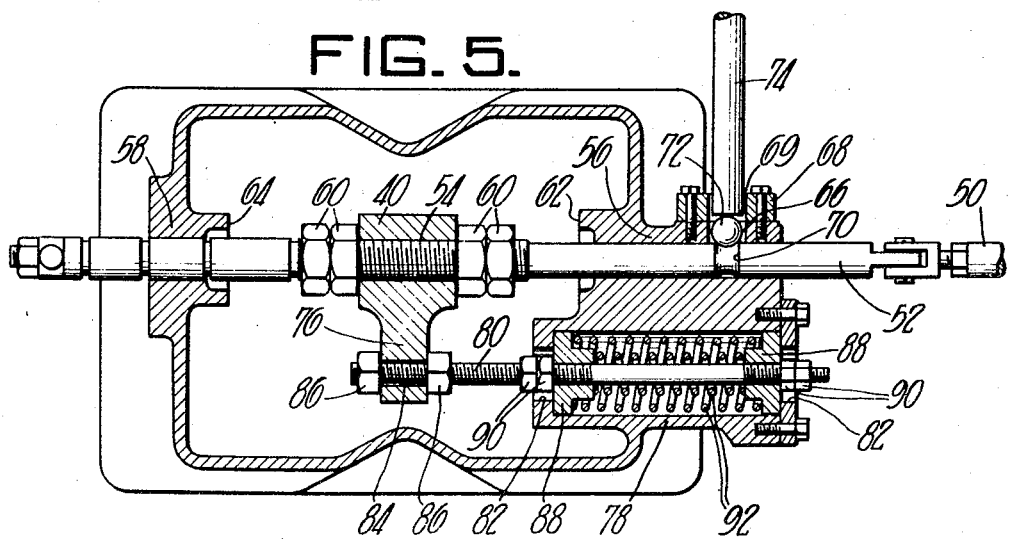
Figure 5 is an enlarged horizontal sectional view showing the means for returning the clutches to their neutral position.
Figure 4:
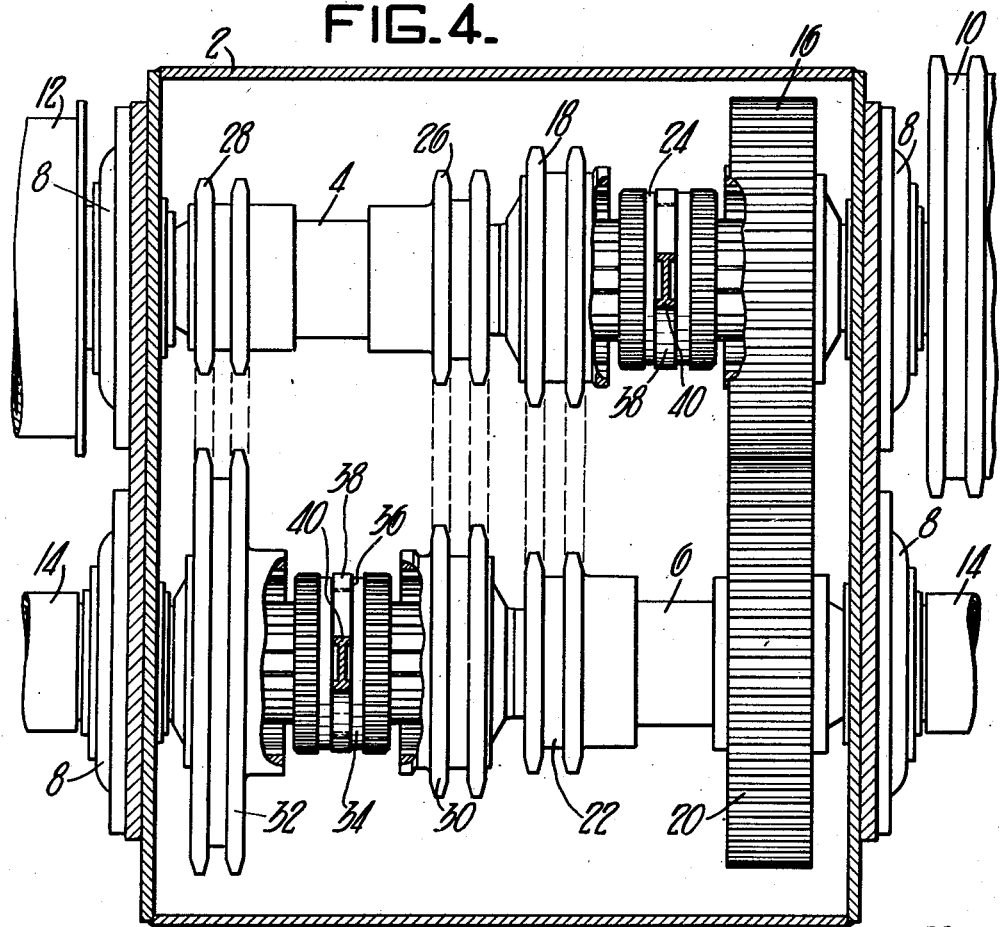
Figure 4 is a horizontal sectional view taken on the line IV—IV of Figure 2.
Figure 6:
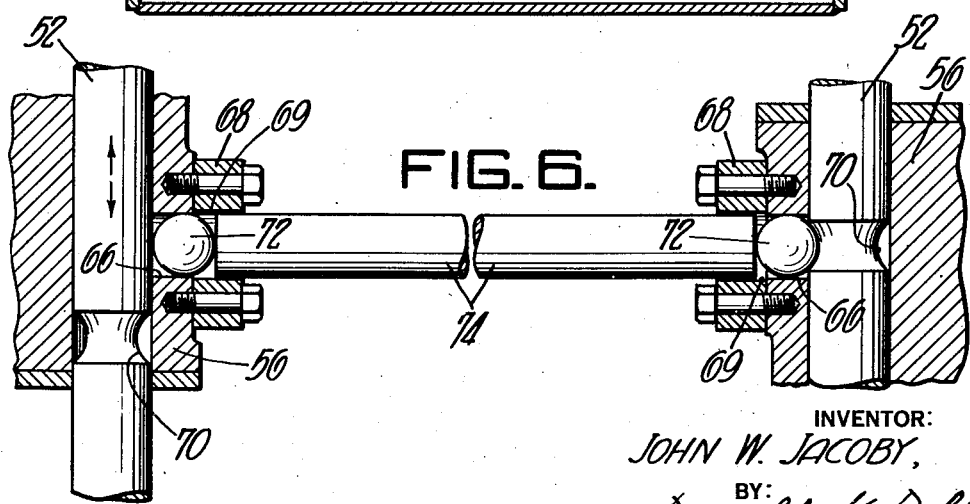
Figure 6 is an enlarged horizontal sectional view showing the inter-lock.

The operation of the device is as follows:

With the clutches 24 and 34 in neutral position the grooves 70 will be opposite each other in the same transverse plane with the ball 72 and spacer bar 74 in the position shown in Figure 5. Air is then applied through conduit 46 to the right hand cylinder 42 as shown in Figure 1 to shift clutch 34 into engagement with sprocket 32. This causes the sprocket 28 to rotate sprocket 32 which turns shaft 6 at its low speed. Movement of rod 52 causes its groove 70 to move out of alignment with the opposite groove 70 so that its ball 72 forces the opposite ball 72 into its groove 70 as shown in Figure 6. Movement of the rod 52 also compresses the springs 92 between the bearing members 88 which are moved with respect to one another by the movement of rod 80.

When it is desired to shift to a higher speed, to neutral, or to reverse, air pressure is released from conduit 46 through the quick release valve 49. The rod 52 is then immediately returned to its neutral position by the springs 92 which force the bearing members 88 apart until they resume the position shown in Figure 5. As will be seen in Figure 5, movement of the rod 52 to the right moves the left hand bearing member 88 to the right, while movement of the rod 52 to the left moves the right hand bearing member 88 to the left, both movements compressing the springs 92 between the bearing members 88. As soon as pressure is relieved in the cylinder 42, the springs 92 expand until the bearing members 88 resume the position shown in Figure 5, in which position the rod 52 is in its neutral position. If, for any reason, pressure is applied to one of the cylinders 42 while the other is not in neutral position, the rod 52 cannot move from neutral position since its ball 72 is in the groove 70 while the opposite ball 72 bears against the opposite rod 52. Thus, the bar 74 and ball 72 act as an inter-lock to prevent movement of one shaft from the neutral position until the other returns to neutral position.

While one embodiment of my invention has been shown and described, it will be apparent that other adaptations and modifications may be made without departing from the scope of the following claims.

I claim:

1. A clutch shifter for a transmission having two parallel shafts with a pair of clutches on each shaft which shifter comprises a pair of double acting power cylinders, said cylinders being arranged parallel to each other and to the transmission shafts, a piston in each cylinder, a rod connected to each piston, means connected to one of said rods for actuating the clutches on one shaft, means connected to the other of said rods for actuating the clutches on the second of said shafts, a bearing for each rod, each of said bearings having an opening therein facing the opposite bearing with the axes of said openings being in the same transverse plane with respect to the rods, a ball in each of said openings, a retainer plate detachably secured to at least one of said bearings, said retainer plate having an opening therein aligned with the opening in the adjacent bearing, a spacer rod extending between said balls, said spacer rod being movable only in an axial direction, each of said rods having a circular groove therein, the axes of said grooves being in the same transverse plane with respect to said rods when the pistons are in their neutral position, the overall length of said pair of balls and spacer rod being substantially equal to the distance between the piston rods plus the depth of one of the grooves, a cylinder adjacent each of the piston rods, a bar extending through said cylinder and connected to the adjacent piston rod, a pair of bearing members, each of said bearing members having an elongated hub portion with an axial hole therethrough for slidably mounting the bearing member on said bar, a pair of spaced apart abutments on said bar, and a spring surrounding said bar and bearing against said bearing members to hold them against said abutments.

2. A clutch shifter for a transmission having two parallel shafts with a pair of clutches on each shaft which shifter comprises a pair of double acting power cylinders, said cylinders being arranged parallel to each other and to the transmission shafts, a piston in each cylinder, a rod connected to each piston, means connected to one of said rods for actuating the clutches on one shaft, means connected to the other of said rods for actuating the clutches on the second of said shafts, a bearing for each rod, each of said bearings having an opening therein facing the opposite bearing with the axes of said openings being in the same transverse plane with respect to the rods, a retainer plate detachably secured to each of said bearings, each of said retainer plates having an opening therein aligned with the opening in the adjacent bearing, each of said rods having a hole therein, the axes of said holes being in the same transverse plane with respect to said rods when the pistons are in their neutral position, spacing means extending between the two shafts into the openings in said bearings, said spacing means being movable only in an axial direction, the length of said spacing means being substantially equal to the distance between the piston rods plus the depth of one of the holes in the piston rod, a cylinder adjacent each of the piston rods, a bar extending through said cylinder and connected to the adjacent piston rod, a pair of bearing members, each of said bearing members having an elongated hub portion with an axial hole therethrough for slidably mounting the bearing member on said bar, a pair of spaced apart abutments on said bar, and a spring surrounding said bar and bearing against said bearing members to hold them against said abutments.

3. A clutch shifter for a transmission having two parallel shafts with a pair of clutches on each shaft which shifter comprises a pair of double acting power cylinders, said cylinders being arranged parallel to each other and to the transmission shafts, a piston in each cylinder, a rod connected to each piston, means connected to one of said rods for actuating the clutches on one shaft, means connected to the other of said rods for actuating the clutches on the second of said shafts, a bearing for each rod, each of said bearings having an opening therein facing the opposite bearing with the axes of said openings being in the same transverse plane with respect to the rods, a ball in each of said openings, a retainer plate detachably secured to at least one of said bearings, said retainer plate having an opening therein aligned with the opening in the adjacent bearing, a spacer rod extending between said balls, said spacer rod being movable only in an axial direction, each of said piston rods having a circular groove therein, the axes of said grooves being in the same transverse plane with respect to said piston rods when the pistons are in their neutral position, the overall length of said pair of balls and spacer rod being substantially equal to the distance between the piston rods plus the depth of one groove, and a double acting spring adjacent each of the piston rods, each spring being connected to its adjacent piston rod to return it to its neutral position when the pressure in the cylinder is relieved.

4. A clutch shifter for a transmission having two parallel shafts with a pair of clutches on each shaft which shifter comprises a pair of double acting power cylinders, said cylinders being arranged parallel to each other and to the transmission shafts, a piston in each cylinder, a rod connected to each piston, means connected to one of said rods for actuating the clutches on one shaft, means connected to the other of said rods for actuating the clutches on the second of said shafts, a bearing for each rod, each of said bearings having an opening therein facing the opposite bearing with the axes of said openings being in the same transverse plane with respect to the rods, a retainer plate detachably secured to each of said bearings, each of said retainer plates having an opening therein aligned with the opening in the adjacent bearing, each of said rods having a hole therein, the axes of said holes being in the same transverse plane with respect to said rods when the pistons are in their neutral position, spacing means extending between the two shafts into the openings in said bearings, said spacing means being movable only in an axial direction, the length of said spacing means being substantially equal to the distance between the piston rods plus the depth of one of the holes in the piston rod, and means connected to each of the piston rods to return them to their neutral position when the pressure in the cylinder is relieved.

5. A clutch shifter for a transmission having two parallel shafts with a clutch on each shaft which shifter comprises a pair of double acting power cylinders, said cylinders being arranged parallel to each other and to the transmission shafts, a piston in each cylinder, a rod connected to each piston, means connected to one of said rods for actuating the clutch on one shaft, means connected to the other of said rods for actuating the clutch on the second of said shafts, a bearing for each rod, each of said bearings having an opening therein facing the opposite bearing with the axes of said openings being in the same transverse plane with respect to the piston rods, a ball in each of said openings, a retainer plate detachably secured to at least one of said bearings, said retainer plate having an opening therein aligned with the opening in the adjacent bearing, a rod extending between said balls, said spacer rod being movable only in an axial direction, each of said piston rods having a circular groove therein facing each other, the axes of said grooves being in the same transverse plane with respect to said piston rods when the pistons are in their neutral position, the overall length of said pair of balls and rod being substantially equal to the distance between the pair of rods plus the depth of one groove.

6. A clutch shifter for a transmission having two parallel shafts with a clutch on each shaft which shifter comprises a pair of double acting power cylinders, said cylinders being arranged parallel to each other and to the transmission shafts, a piston in each cylinder, a rod connected to each piston, means connected to one of said rods for actuating the clutch on one shaft, means connected to the other of said rods for actuating the clutch on the second of said shafts, a bearing for each rod, each of said bearings having an opening therein facing the opposite bearing with the axes of the said openings being in the same transverse plane with respect to the piston rods, a retainer plate detachably secured to each of said bearings, each of said retainer plates having an opening therein aligned with the opening in the adjacent bearing, each of said piston rods having a hole therein, the axes of said holes being in the same transverse plane with respect to said piston rods when the pistons are in their neutral position, spacing means extending between the two shafts into the openings in said bearings, said spacing means being movable only in an axial direction, the length of said spacing means being substantially equal to the distance between the piston rods plus the depth of one of the holes in the piston rod.

JOHN W. JACOBY.

REFERENCES CITED

The following references are of record in the file of this patent:

UNITED STATES PATENTS

| Number | Name | Date |
|---|---|---|
| 1,501,025 | Mason | July 8, 1924 |
| 1,830,395 | Hanson | Nov. 3, 1931 |
| 1,865,690 | Hanson | July 5, 1932 |
| 1,993,247 | Penati | Mar. 5, 1935 |
| 2,110,994 | Linsley | Mar. 15, 1938 |
| 2,124,507 | Hodgkins | July 19, 1938 |
| 2,297,026 | Sanford | Sept. 29, 1942 |
| 2,402,343 | Price | June 18, 1946 |

FOREIGN PATENTS

| Number | Country | Date |
|---|---|---|
| 324,984 | Germany | Sept. 9, 1920 |